United States Patent [19]

Bartholomew et al.

[11] Patent Number: 4,646,840

[45] Date of Patent: Mar. 3, 1987

[54] FLOTATION RISER

[75] Inventors: Roy E. Bartholomew, Huffsmith; Ronald G. Pettus, Houston; Emanuel Schnitzer, Houston; Edmund A. Fisher, Houston, all of Tex.

[73] Assignee: Cameron Iron Works, Inc., Houston, Tex.

[21] Appl. No.: 729,623

[22] Filed: May 2, 1985

[51] Int. Cl.$^4$ ............................................. E21B 7/12
[52] U.S. Cl. .................................. 166/350; 166/367; 405/195; 405/171
[58] Field of Search ............... 166/345, 350, 363, 367; 175/5, 6, 7; 405/171, 195, 206, 209

[56] References Cited

U.S. PATENT DOCUMENTS

| | | | |
|---|---|---|---|
| 3,017,934 | 1/1962 | Rhodes et al. | 166/350 |
| 3,858,401 | 1/1975 | Watkins | 166/350 X |
| 4,040,264 | 8/1977 | Neilon | 175/7 X |
| 4,102,142 | 7/1978 | Lee | 405/195 |
| 4,176,986 | 12/1979 | Taft et al. | 166/350 X |
| 4,422,801 | 12/1983 | Hale et al. | 166/350 X |
| 4,470,722 | 9/1984 | Gregory | 405/195 |

Primary Examiner—Stephen J. Novosad
Assistant Examiner—David J. Bagnell
Attorney, Agent, or Firm—Vinson & Elkins

[57] ABSTRACT

A flotation riser having a series of annular chambers with a riser string extending in free-standing relation through said chambers, means for supplying gas to the chambers to control buoyancy, means to supply gas to a plurality of the lowermost chambers to provide an emergency supply of deballasting gas, and means for remotely releasing said supply of gas into the chambers above to render the flotation riser free-standing to permit release from the floating platform during emergencies. A method of storing emergency deballasting gas and for emergency deballasting of the chambers to render the flotation riser freee-standing including the steps of supplying gas to the lowermost chambers, retaining the gas in said lowermost chambers, and remotely releasing the gas and conducting it to higher chamber to deballast such chambers sufficient so that said flotation riser is free-standing.

11 Claims, 6 Drawing Figures

_4,646,840_

FLOTATION RISER

BACKGROUND

The present invention relates to a flotation riser which extends from a subsea location to a floating platform and is provided with a flotation structure and flotation system which allows full control of the buoyancy of the riser. In such risers it is often necessary because of severe weather to move the floating platform and thus, the riser must be disconnected from the floating platform at a level below the water surface so as not to present a hazard to shipping and the riser should have sufficient buoyancy to be free-standing against water currents so that it is not destroyed by excessive angular motion while disconnected from the platform. The time necessary to release a riser and cause it to be buoyant is limited in emergency conditions. To supply the air necessary to allow the riser to have sufficient buoyancy when it is discovered from the floating platform it is either necessary to have a high capacity air compressor or a smaller compressor with large capacity storage tanks on the floating platform. Neither of these alternatives is totally acceptable since space and weight at the platform are at a premium and the high cost of a high capacity air compressor.

In such risers it has been proposed previously to provide a riser and to surround the riser with a series of chambers with the riser forming the interior of the chamber. An example of this prior art structure is the B. J. Watkins U.S. Pat. No. 3,858,401. This patent discloses the riser flotation chambers surrounding the riser and a float control to control the amount of water and gas in each chamber and thereby control the buoyancy of each chamber. The W. J. Hayes et al U.S. Pat. No. 3,330,340 discloses another buoyancy structure for a marine conductor which includes sleeves extending across the individual flotation chambers and through which small diameter pipe strings can be contained and be freely insertable. U.S. Pat. Nos. 3,354,951 and 3,522,709 disclose other types of prior art buoyant marine conductors or risers.

SUMMARY

The present invention includes a plurality of annular chambers surrounding a free-standing riser with suitable means for controlling the amount of air and water in each chamber and also including a means for providing an emergency supply of air for rendering the riser sufficiently buoyant so that it is free-standing and does not have to be charged during the emergency from the floating structure. This improved flotation riser has application to both drilling and production risers. The improved riser includes a plurality of annular housings interconnected to form a plurality of buoyancy chambers surrounding an open central bore, the lower of said housings being connected to a subsea wellhead and the upper being supported from a floating structure, a tubular riser extends through the open central bore of said plurality of chambers, a plurality of flanges are secured and extend outwardly from said annular housings with a plurality of openings through the flanges to receive free-standing tubular strings extending from the subsea wellhead to the upper of the annular chambers, means for supplying air to the chambers, means for controlling the amount of air in each chamber to maintain the desired amount of buoyancy, a reserve air storage in the lower group of the annular chambers and means for releasing the reserve air through a cascading system to provide sufficient buoyancy to render the riser and flotation system self-standing.

An object of the present invention is to provide an improved flotation riser with controlled buoyancy and both free-standing riser and free-standing tubular strings.

Another object is to provide an improved flotation riser having a self-contained buoyancy system which can be actuated to render the flotation riser free-standing.

BRIEF DESCRIPTION OF THE DRAWINGS

These and other objects of the present invention are hereinafter set forth and explained with reference to the drawings wherein.

DESCRIPTION OF THE PREFERRED EMBODIMENTS

Figure 1:
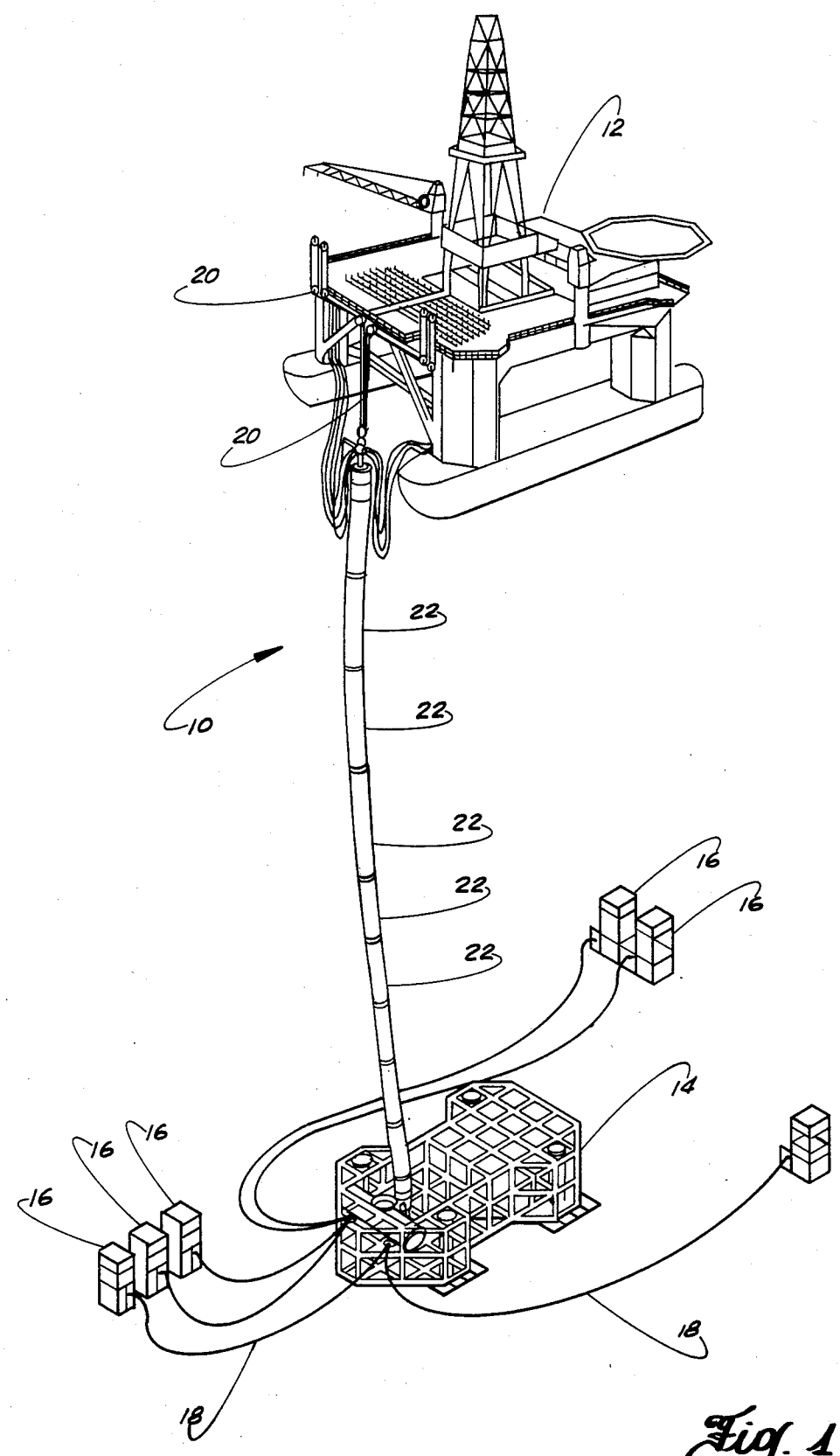
FIG. 1 is an elevation view of a subsea template serviced by a floating platform and with the improved flotation riser extending from the subsea template or riser base location to the floating platform.

The improved flotation riser 10 of the present invention is illustrated in FIG. 1 extending between floating platform 12 to subsea location or template 14 which is illustrated as central subsea collecting site which serves several sites, such as subsea wellhead 16 which is illustrated to be connected to the central location 14 by several subsea flowlines 18. Platform 12 includes suitable means 20 for exerting a tension on the upper end of flotation riser 10. Flotation riser 10 includes a series of annular housings 22 through which riser 24 extends.

Figure 2:
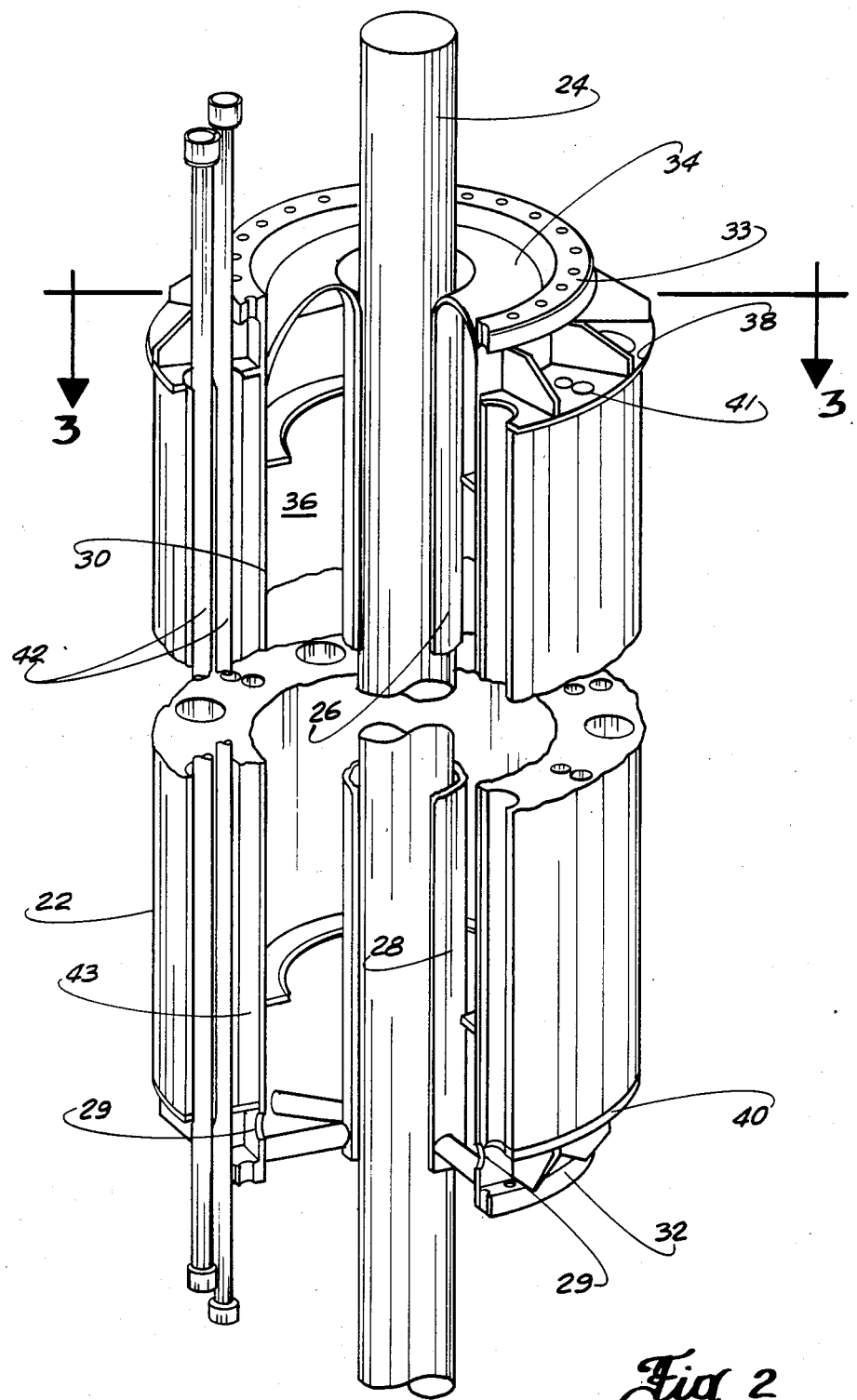
FIG. 2 is a detailed sectional view taken along line 2—2 in FIG. 3 of one of the improved annular flotation structures having its intermediate portion broken away and showing the free-standing riser extending through its central bore.
Figure 3:
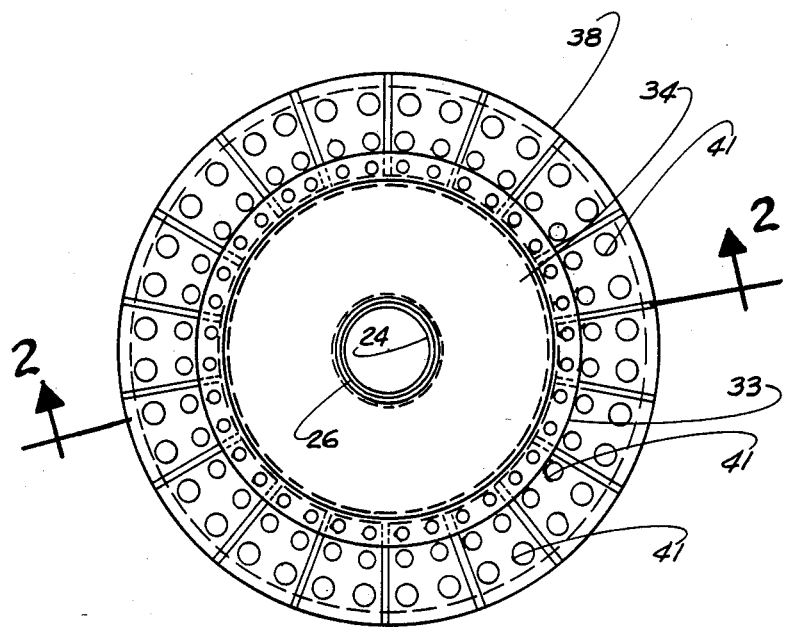
FIG. 3 is a transverse sectional view to clearly illustrate the free-standing tubular strings carried by the annular flotation chamber flanges.

Riser 10 is more clearly illustrated in FIGS. 2 and 3. Annular housings 22 include central bore 26 through which riser 24 is inserted and extends in free-standing relationship to housings 22. Annular housing 22 is watertight except as hereinafter described with respect to the flotation system. Housing 22 includes inner annular shell 28, outer annular shell 30, lower annular flange 32 secured to shells 28 and 30, upper annular flange 33 secured to the upper end of outer shell 30 and upper annular dome 34 which is sealed to shells 28 and 30 to form annular flotation chamber 36. Suitable fasteners (not shown) are used to connect upper flanges 33 to lower flanges 32 in the next higher housing 22 to thereby interconnect the series of housings 22. Flanges 38 and 40 are secured to the upper and lower portions of outer shell 30. Each of flanges 38 and 40 are provided with openings 41 through which free-standing tubing strings 42 are inserted and extend. Vent holes 29 are provided in shell 30 for expelling or introducing water and to ensure that chambers 36 are not over-pressured either externally or internally. As best seen in FIG. 2, syntatic foam modules 43 with tubing openings therein are installed around shell 30 between flanges 38 and 40.

Thus when flotation riser 10 is installed, it extends from subsea location 14 to the position under floating platform 12 with tubular strings 42 and riser 24 being free-standing. Free-standing is meant that strings 42 and riser 24 are small enough to pass through the openings in flanges 38 and 40 and through central bore 26 in housings 22. With air in chambers 36, adjustable as hereinafter set forth, each chamber 36 provides a desired amount of buoyancy to flotation riser 10 which is used to control the position of riser 24 and strings 42. Thus, when the riser 10 is inclined from the vertical the buoyancy of chambers 36 exerts a force on riser 24 and strings 42 to return them to a vertical position.

As explained above one of the primary objects of the present invention is to provide an air reservoir which can deballast the flotation riser 10 sufficiently to ensure that it can be free-standing against currents whenever conditions require that the floating platform be moved without disconnecting the riser from its subsea connection. The present invention provides this deballasting structure and method as hereinafter set forth. This structure and method are schematically illustrated in FIGS. 4 through 6.

Figure 4:
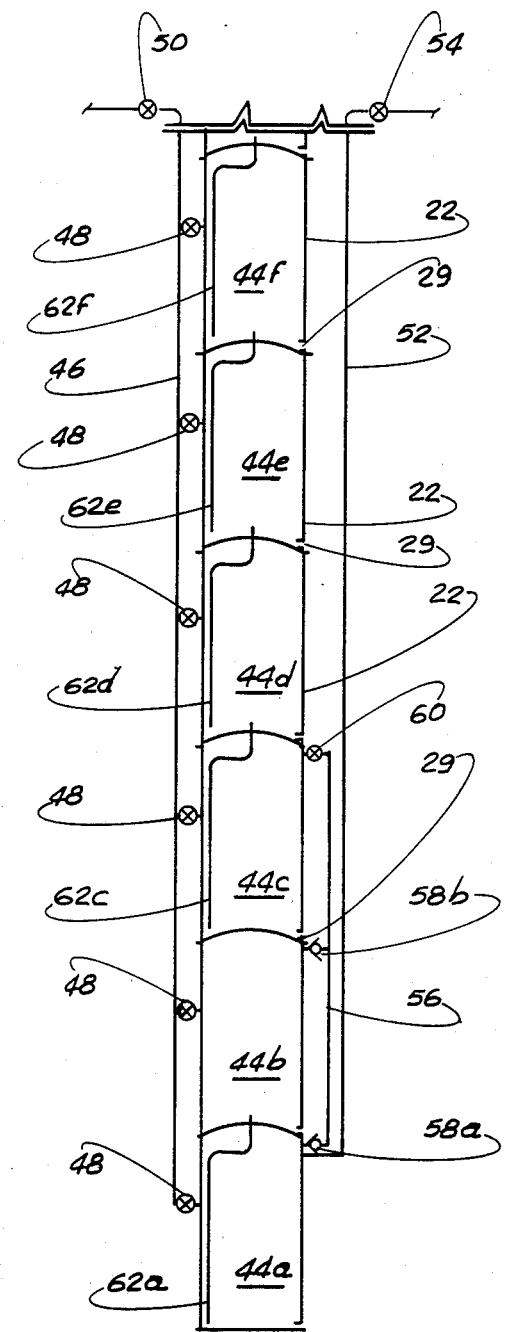
FIG. 4 is a schematic illustration of the flotation control system of the present invention.

In FIG. 4, the lower end of flotation riser 10 is shown with the omission of riser 24 and tubing strings 42 and annular chambers 36 being shown as cylindrical chambers 44. Lower chamber 44a is illustrated as being the chamber immediately above the connection of flotation riser 10 to subsea location 14. The chambers above chamber 44a are identified by the numerals 44 and the letters "b" through "f" in ascending order. Chambers 44 are served by gas manifold 46 which connects into each chamber individually through valves 48 which preferably is controlled by the level of water in its chamber. Main valve 50 controls flow of gas to manifold 46. Additionally, line 52 connects into chamber 44a and is controlled by valve 54. Line 52 functions as the supply line to the deballasting system including chambers 44a, 44b and 44c together with manifold 56 connecting through check valves 58a and 58b into the upper end of chambers 44a and 44b and remote controlled shut-off valve 60 into the upper end of chamber 44c. While only two of chambers 44 are shown in the drawings as forming the reservoir portion of the deballasting system either additional or fewer chambers may be used so long as sufficient deballasting gas is provided to render flotation riser 10 free-standing when it is disconnected from floating platform 12.

Figure 5:
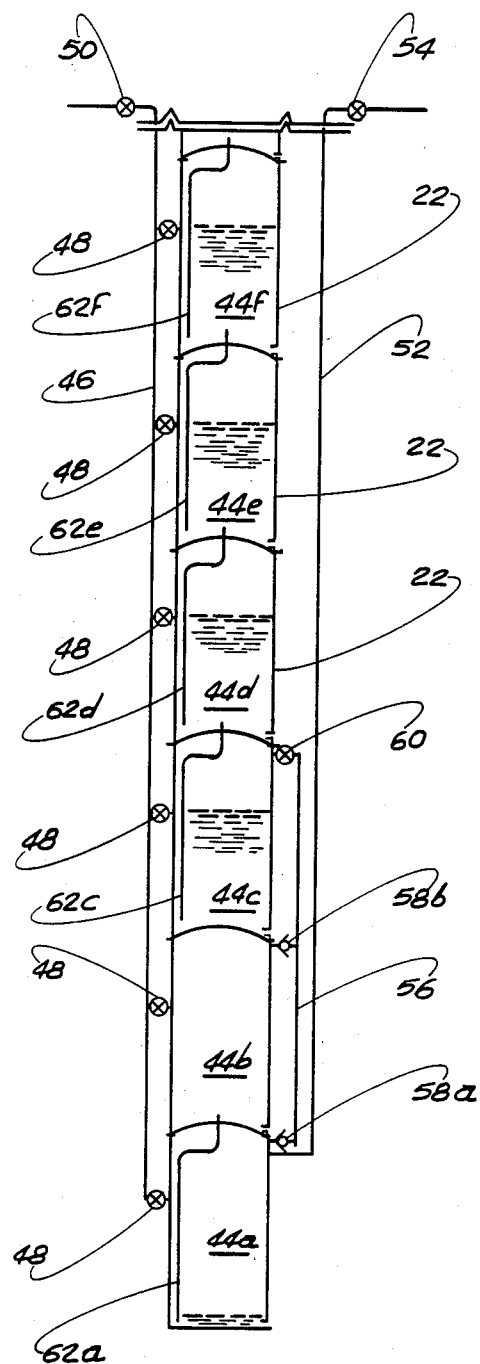
FIG. 5 is another schematic illustration of the self-contained air reservoir and reserve buoyancy system in its fully charged condition.
Figure 6:
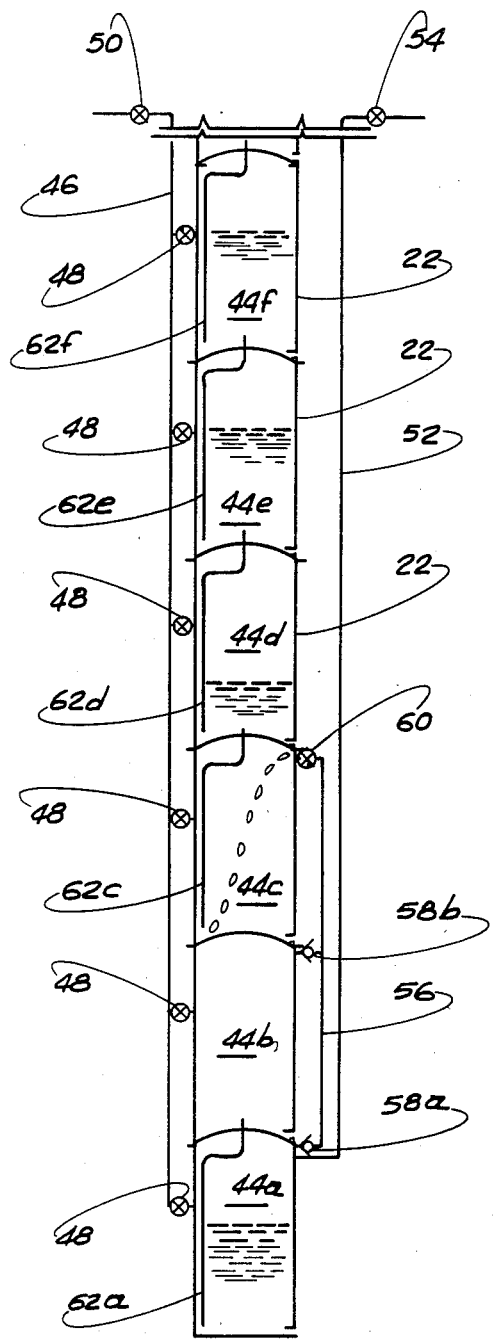
FIG. 6 is another schematic illustration of the reserve buoyancy system in operation.

FIG. 5 illustrates the condition of the deballasting system and the chambers thereabove during normal operations. Chambers 44a and 44b have been charged through line 52 and valve 60 is closed to confine the gas charge in chambers 44a and 44b. The other chambers are shown to include both water and gas with the water level control functioning to control the buoyancy of flotation riser 10 by controlling the amount of water and gas in each of the chambers in a manner known in the art. Cascading ducts 62 are positioned in each of the chambers to extend from the lower portion of the chamber into the lower portion of the next higher chamber. No duct 62 is provided between the upper of the reservoir chambers (chamber 44b in the drawings) to the chamber immediately above such chamber 44b (chamber 44c).

When the deballasting system is to be operated, valve 60 is remotely opened to release the deballasting gas through manifold 56 from chambers 44a and 44b. This gas flows into the upper portion of chamber 44c and forces the water out of chamber 44c and gas flows through duct 62c and into chamber 44d. The system proceeds in the cascading of gas into the next higher chamber until the gas is completely utilized to provide the necessary free-standing buoyancy. This system functions without interruption once valve 60 has been opened and can be completed while the upper end of flotation riser 10 is being disconnected from floating platform 12. FIG. 6 illustrates this cascading action of the gas upwardly through the chambers. In chamber 44c the flow of gas is schematically illustrated as a series of droplets to show the flow from the connection of manifold 56 into the upper end of chamber 44c to the lower portion of chamber 44c and into the lower end of duct 62c.

Thus, with the improved system, a small compressor may be used in charging the system and no storage facilities are needed on the floating platform. The system is also quick acting and will move independently to completion once valve 60 is opened unless valve 60 is closed. With the opening of valve 60 it is suggested that the normal buoyancy control system be inactivated to ensure that it does not defeat the emergency system.

What is claimed is:

1. A flotation riser comprising
    a series of annular housings being interconnected to form a plurality of buoyancy chambers surrounding an open central bore,
    means for connecting the lower of said housings to a subsea location,
    means for supporting the upper of said housings from a floating structure,
    a free-standing tubular string extending through the central bore of said series of housings with connection therebetween only at the lower and upper ends thereof, and having an external diameter slightly smaller than the internal diameter of said central bore and to allow relative freedom of axial movement therebetween, and
    means supplying a gas to said chambers to provide each of said chambers with a preselected amount of buoyancy.

2. A flotation riser according to claim 1 including
    a flange secured to an extending outward from each of said plurality of said housings,
    each of said flanges having a plurality of openings therethrough,
    a plurality of free-standing tubular strings positioned in said openings to extend from said subsea wellhead to the upper one of said housings.

3. A flotation riser according to claim 1 including
    a gas supply line connected into the lower of said annular housings to supply gas to the chambers of at least the two lower housings,
    means for manifolding said chambers of said lower housings to form an emergency gas reservoir,
    means for conducting gas from said lower housings to the chamber immediately above said lower housings, and
    remote control valve means for controlling release of gas from said lower housings to chambers thereabove to supply emergency gas for flotation of said riser.

4. A flotation riser according to claim 3 wherein said gas release means includes cascading means connecting from said emergency gas reservoir to the next higher chamber and progressively between chambers whereby gas released from said reservoir progressively deballasts the chambers.

5. A flotation riser according to claim 4 wherein said cascading means includes means defining a connection from said emergency gas reservoir into the upper portion of the next higher chamber, and a duct in each of said next higher chamber and those chambers thereabove extending from a position in the lower portion of its chamber into the next higher chamber.

6. The method of providing an emergency deballasting system for a flotation riser having a plurality of flotation chambers including the steps of supplying gas to a plurality of the lower of said flotation chambers, retaining gas in said plurality of lower chambers as an emergency source of deballasting gas, and remotely releasing gas from said plurality of lower chambers into the chambers above them to deballast the chambers under emergency conditions and provide sufficient buoyancy to maintain said flotation riser in a substantially vertical position above its connection to a subsea wellhead when its upper end is free of all connections.

7. The method according to claim 6 including the step of cascading gas progressively up through said chambers above said reservoir chambers.

8. A floatation riser comprising a series of housings being interconnected to form a plurality of buoyancy chambers, means for connecting the lower of said housings to a subsea location, means for supporting the upper of said housings from a floating structure, means supplying a gas to said chambers to provide each of said chambers with a preselected amount of buoyancy, a free-standing tubular string extending from said subsea location to the upper end of said housings, and said housings each defining an opening through which said tubular string extends without direct connection thereto whereby said housings provide a force on said tubular string without direct attachment which force is a righting force to urge said tubular string toward a vertical position.

9. A flotation riser according to claim 8 wherein said housings are annular in shape with said openings being axially extending central openings, and said tubular string is a riser extending through said central openings.

10. A flotation riser according to claim 9 wherein said housings include flanges extending radially outward from said housings, and said openings extend through said flanges in a direction parallel to the axis of said housings and are in alignment and of sufficient diameter whereby said tubular string extends therethrough without having a direct connection to said housings.

11. A flotation riser according to claim 10 wherein said housings are annular in shape with said openings being axially extending central openings, said tubular string extending through said central openings is a riser, and a plurality of tubular strings extend in free-standing relationship to the openings in said flanges.

* * * * *